March 20, 1951     K. R. MacKENZIE     2,545,623

FREQUENCY MODULATION SYSTEM

Filed Aug. 17, 1948

INVENTOR.
KENNETH R. MacKENZIE
BY
Roland A. Anderson
ATTORNEY

Patented Mar. 20, 1951

2,545,623

UNITED STATES PATENT OFFICE 2,545,623

FREQUENCY MODULATION SYSTEM

Kenneth R. MacKenzie, Pacific Palisades, Calif., assignor to the United States of America as represented by the United States Atomic Energy Commission Application August 17, 1948, Serial No. 44,788

5 Claims. (Cl. 250—36)

This invention relates to frequency modulators and more particularly to a novel mechanical capacitor arrangement for wobbling the oscillating frequency of a high "Q" line.

Heretofore, low loss or high "Q" tuned resonant lines have been frequency modulated by placing a rotating variable capacitor either across the high impedance end of the line to ground, or in series with the low impedance end of the line to ground. When utilizing a practical high speed rotary variable capacitor it is difficult to obtain more than a 1.4 to 1 frequency ratio change with either of these methods.

Now it has been found that by using a three-quarter wave length line shorted at one end and a variable capacitor interposed in the line at a one-quarter wave length from the shorted end, the electrical wave length of the three-quarter wave length line can be extended to one-quarter wave length by varying the capacity of the series capacitor. The capacitor is of the rotating plate type which may be continuously rotated to thereby continuously vary the resonant frequency of the line over a 3 to 1 frequency ratio. The speed of the frequency modulation cycle is determined by the speed of the rotary capacitor.

It is therefore an object of this invention to provide a method and system for frequency modulating over a frequency ratio of 3 to 1.

Another object of this invention is to provide a method and means for frequency modulating a low loss or high "Q" line.

A further object of this invention is to provide a means for frequency modulation by mechanical variation of capacity.

A still further object of this invention is to provide a cyclotron accelerating system that can be frequency modulated over a frequency ratio of 3 to 1.

The invention, both as to its organization and method of operation, together with further objects and advantages thereof, will best be understood by reference to the following specification taken in connection with the accompanying drawings, in which.

Figure 1:
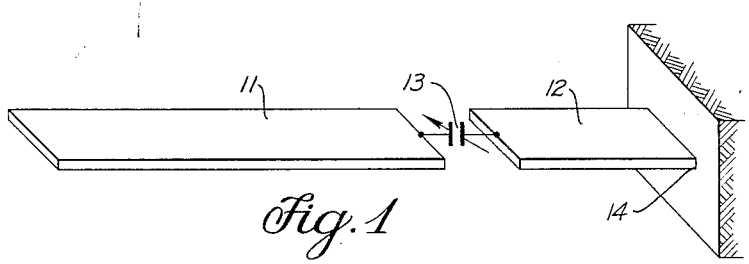
Figure 1 is a pictorial isometric view of a rectangular line three-quarter wave length long with a variable capacitor interposed one-quarter wave length from the grounded end.

Referring directly to the drawings for a more detailed discussion and description of the invention and particularly to Fig. 1 thereof, there is shown a rectangular transmission line 11, one-half wave length long and a similar rectangular transmission line 12, one-quarter wave length long connected together by a variable capacitor 13. One end of the line 12 is connected to ground at point 14 and assumes zero potential for all modes of oscillation of the lines. The combination of lines 11 and 12 form a uniform line three-quarter wave length long with a series variable capacitor 13 located one-quarter wave length from the ground end.

Figure 2:
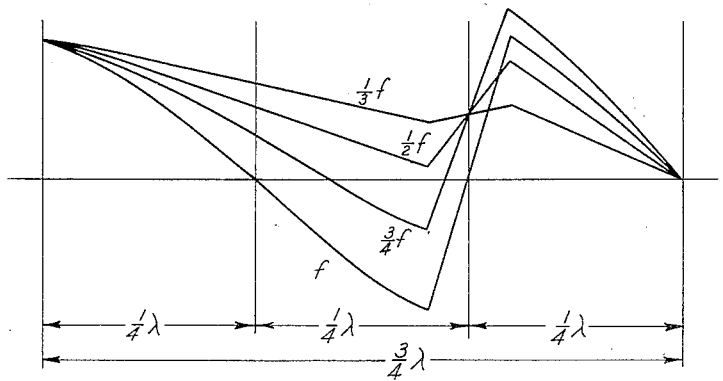
Fig. 2 is a diagram representing the voltage distribution along the line at various settings of the variable capacitor.

Now referring more particularly to Fig. 2, there is shown the voltage distribution existing on the line shown in Fig. 1 when energized by a suitable power source. The voltage distribution is shown for four different settings of the variable capacitor. Curve $f$ represents the condition of zero minimum capacity of the capacitor in which the line is resonant to three-quarter wave of the highest frequency of the desired frequency swing. Curves "three-quarter $f$" and "one-half $f$" represent intermediate settings of the capacitor and curve "one-third $f$" represents the case of maximum capacity, and the system responds as a one-quarter wave system at one-third the original frequency. As can be seen, one cycle of the capacitor from minimum capacity to maximum capacity alters the resonant frequency of the system over a ratio of 3 to 1.

Figure 3:
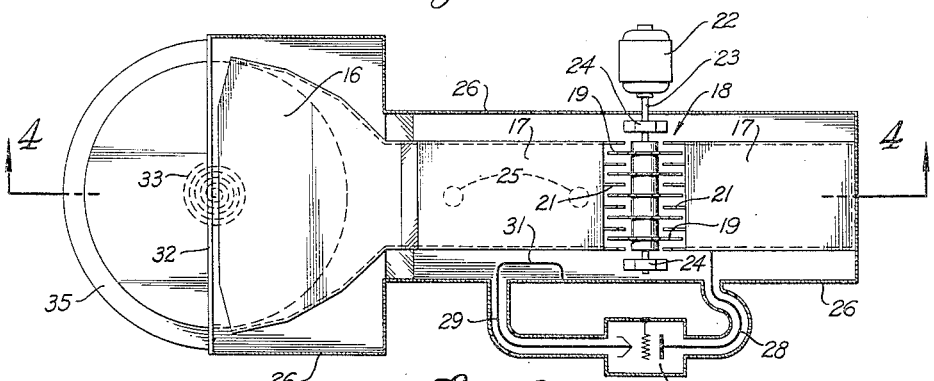
Fig. 3 is a sectional plan view of one practical embodiment of the invention used as a cyclotron accelerating system together with an oscillator adapted to energize the line.
Figure 4:
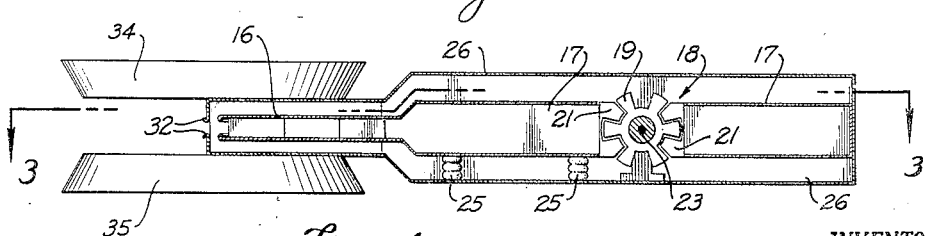
Fig. 4 is a longitudinal section view of the cyclotron accelerating system shown in Fig. 3.

For a practical embodiment of the invention, reference is now made to Figs. 3 and 4 which show an accelerating system for a cyclotron which can be frequency modulated over a frequency ratio of 3 to 1 in order to maintain phase stability of the acceleraed particles during relativistic mass changes of the particles. This representative arrangement in Fig. 3 and Fig. 4 shows a plan view and a side elevation of a cyclotron dee 16 and rectangular transmission line 17 attached together and three-quarter wave length long from the front edge of the dee 16 to the grounded shorted end of transmission line 17. The three-quarter wave length dimension is made correct for the upper frequency limit of the desired frequency swing. One-quarter wave length from the shorted end of transmission line 17 and in electrical series therewith is provided a rotary variable capacitor 18 consisting of a rotor with six rows of teeth 19. Attached to each of the two interrupted ends of transmission line 17 is a capacitor stator consisting of two rows of teeth 21 mounted in meshing relationship with the rotor teeth 19.

The rotary capacitor 18 is supported by a shaft 23 journaled in two outboard bearings 24 and driven at high speed by suitable means such as an electric motor 22 in driving relationship with rotor shaft 23. The speed of rotation of the rotary capacitor 18 and the number of teeth 19 on the rotor determines the speed or repetition rate of the frequency modulation cycle.

Enclosing the entire oscillating system including the dee 16, transmission line 17, and rotary capacitor 18 is a shield 26, thus forming in combination with transmission line 17 a substantially closed transmission line oscillating system. Transmission line 17 is held in axial alignment with shield 26 by the interposed insulators 25, thereby maintaining proper spacing between dee 16 and ground electrodes 32 and also proper spacing of rotor and stator teeth 19 and 21 of the rotary variable capacitor 18.

Radio-frequency power may be supplied to the transmission line oscillating system by an arrangement such as is shown in Fig. 3 and preferably comprising a grounded grid oscillator tube 27 coupled to the inner transmission line 17 through an anode transmission line 28 attached to the main transmission line 17 at a location to effect the proper impedance match. Excitation for oscillator tube 27 is derived from a loop 31 inductively coupled to the main transmission line 17 in which induced exciting voltage is delivered to the oscillator tube 27 by cathode transmission line 29.

In operation, a pulse or burst of ions is introduced into the center of the dee 16 and is started in motion by the potential difference between dee 16 and ground electrodes 32 after which the charged ions 33 spiral outward because of the magnetic flux formed by magnet pole tips 34 and 35. As the charged ions gain energy by passing repeatedly through the potential difference produced by dee 16 and ground electrodes 32 they undergo relativistic mass changes which increase the time it takes the ions to travel from one accelerating gap to the next. In order to fully accelerate the ions from the center to the outside edge of the cyclotron it is necessary to maintain the proper relationship between the radio-frequency cycle and the ions as they pass across the accelerating gaps. Inasmuch as the time of flight of the ions between accelerating gaps increases as they are accelerated, it is necessary to reduce the frequency of the accelerating potential in order to maintain phase stability throughout the entire acceleration period.

The ion pulse is synchronized with the rotary capacitor and the ions are injected at the minimum capacity or unmeshed condition of the rotary capacitor which is the highest oscillating frequency of the system. As the ions are accelerated, the capacity of the rotary capacitor is increasing thereby decreasing the frequency of oscillation and keeping the ions in phase with the maximum accelerating voltage. After the capacitor reaches its maximum capacity the accelerated ions will have reached the outside edge of the magnet where they are extracted and after the capacitor reaches minimum capacity again another pulse of ions is introduced into the center of the dee and the cycle is repeated.

While the invention has been described with particular application to a cyclotron, it will be appreciated that it is applicable to any other device requiring frequency modulation over a frequency ratio of 3 to 1 or less.

It will therefore be understood that this invention is not to be limited to the details of the structure and methods of operation hereinabove described but that many modifications may be made in the apparatus and method within the scope of the following claims.

What is claimed is:

1. In a cyclotron accelerating system comprising a three-quarter wave length transmission line including an inner and outer conductor shorted at one end, a set of electrodes attached to the unshorted end of said three-quarter wave length transmission line, a second set of grounded electrodes positioned adjacent to said first set of electrodes and spaced apart to form accelerating gaps, a variable capacitor in series with said inner conductor one-quarter wave length from said shorted end, an oscillator tube having at least an anode, control grid, and cathode, said grid being directly connected to said outer conductor, an anode transmission line connected between said inner conductor and said anode, and a cathode transmission line connected at one end to said cathode and at the other end to the inner surface of said outer conductor thereby providing a coupling loop between said conductors.

2. In a cyclotron accelerating system comprising a three-quarter wave length concentric transmission line including an inner and outer conductor disposed axially and shorted at one end, a set of electrodes attached to the unshorted end of said three-quarter wave length transmission line, a second set of electrodes positioned adjacent to said first set of electrodes and spaced apart to form accelerating gaps, a rotatable multi-toothed variable capacitor interrupting and in series with said inner conductor of said concentric transmission line one-quarter wave length from said shorted end, a radio frequency electron discharge oscillator tube having an anode, a filament and a grid wherein said tube receives excitation from a coupling loop entering the interior of said concentric transmission line and the anode of said tube is directly connected to said transmission line inner conductor by an anode transmission line thereby energizing said three-quarter wave length transmission line, whereby increasing the capacity of said capacitor extends the electrical wave length of said three-quarter wave length transmission line to one-quarter wave length.

3. In a three-quarter wave length transmission line tank circuit comprising an inner and an outer conductor disposed axially and shorted at one end, a rotatable multi-toothed variable capacitor having interrupting and series connection with said inner conductor of said transmission line one-quarter wave length from said shorted end, a radio frequency electron discharge oscillator tube having an anode, a filament and a grid, excitation means including a coupling loop coupled to the outer conductor of said transmission line and connected to the filament of said tube, means including an anode transmission line interconnecting the inner conductor of said first named transmission line and the anode of said tube thereby energizing said three-quarter wave length transmission line, whereby said capacitor produces cyclic variations to the resonant frequency of said three-quarter wave length transmission line.

4. In a transmission line system adapted to deliver a substantially constant voltage over a three-to-one frequency range, the combination comprising an outer conductor having a length substantially equal to three quarters of the wave length of the upper frequency of the frequency range and being closed at one end, a first section of inner conductor having a length substantially one quarter of the wave length of said upper frequency and being connected at one end to the closed end of said outer conductor, a second section of inner conductor having a length substantially half of the wave length of said upper frequency disposed in spaced-apart relation with said first section, the facing ends of said conductor sections having a plurality of opposing plates, a rotary shaft having a plurality of projecting plates mounted in staggered relation with respect to said opposing plates, said shaft being mounted between said conductor sections, an oscillator tube having at least an anode, control grid, and cathode, said grid being directly connected to said outer conductor, an anode transmission line connected between said inner conductor and said anode, and a cathode transmission line connected at one end to said cathode and at the other end to the inner surface of said outer conductor thereby providing a coupling loop between said conductors.

5. In a transmission line system adapted to deliver a substantially constant voltage over a three-to-one frequency range, the combination comprising a rectangular outer conductor having a length substantially equal to three quarters of the wave length of the upper frequency of the frequency range and being closed at one end, a first rectangular section of inner conductor having a length substantially one quarter of the wave length of said upper frequency and being connected at one end to the closed end of said outer conductor, a second rectangular section of inner conductor having a length substantially half of the wave length of said upper frequency disposed in spaced-apart relation with said first section, the facing ends of said conductor sections having a plurality of opposing plates, a rotary shaft mounted between said conductor sections and having a plurality of projecting plates mounted in staggered relation with respect to said opposing plates, an oscillator tube having at least an anode, control grid, and cathode, said grid being directly connected to said outer conductor, an anode transmission line connected between said first conductor section and said anode, and a cathode transmission line connected at one end to said cathode and at the other end to the inner surface of said outer conductor at a point along the portion surrounding said second conductor section thereby providing a coupling loop between said conductors.

KENNETH R. MacKENZIE.

REFERENCES CITED

The following references are of record in the file of this patent:

UNITED STATES PATENTS

| Number | Name | Date |
| --- | --- | --- |
| 2,104,916 | Evans | Jan. 11, 1938 |
| 2,245,597 | Lindenblad | June 17, 1941 |
| 2,272,211 | Kohler | Feb. 10, 1942 |
| 2,408,895 | Turner | Oct. 8, 1946 |
| 2,413,836 | Larson | Jan. 7, 1947 |
| 2,434,917 | Fuchs | Jan. 27, 1948 |
| 2,436,398 | Morton | Feb. 24, 1948 |
| 2,458,650 | Schreiner et al. | Jan. 11, 1949 |